United States Patent [19]

Bevington

[11] Patent Number: 4,895,998

[45] Date of Patent: Jan. 23, 1990

[54] ENCAPSULATED ELECTRICAL COMPONENT AND METHOD OF MAKING SAME

[75] Inventor: Jack T. Bevington, Ashland, Ohio

[73] Assignee: McNeil (Ohio) Corporation, St. Paul, Minn.

[21] Appl. No.: 232,103

[22] Filed: Aug. 15, 1988

[51] Int. Cl.[4] .......... H01G 1/03

[52] U.S. Cl. .......... 174/52.2; 264/272.18

[58] Field of Search .......... 174/52.2; 361/272; 264/272.18

[56] References Cited

U.S. PATENT DOCUMENTS

| | | | |
|---|---|---|---|
| 1,873,548 | 8/1932 | Cole | 264/272.18 X |
| 2,577,005 | 12/1951 | DiGiacomo | 174/52.2 X |
| 3,153,694 | 10/1964 | Tomlinson | 174/52 |
| 3,317,796 | 5/1967 | Thompson | 174/52.2 X |
| 3,436,610 | 4/1969 | Sparrow et al. | 317/250 |
| 3,442,828 | 5/1969 | Engelhardt et al. | 260/2.5 |
| 3,458,645 | 7/1969 | Braiman | 174/52.2 |
| 3,749,601 | 7/1973 | Tittle | 117/218 |
| 4,035,905 | 7/1977 | Clement | 29/570 |
| 4,045,867 | 9/1977 | Strom | 29/628 |
| 4,228,115 | 10/1980 | Gardner et al. | 264/46.4 |
| 4,470,786 | 9/1984 | Sano et al. | 425/125 |
| 4,629,597 | 12/1986 | Charlebois et al. | 264/278 |

*Primary Examiner*—Leo P. Picard
*Assistant Examiner*—David A. Tone
*Attorney, Agent, or Firm*—Renner, Kenner, Greive, Bobak, Taylor & Weber

[57] ABSTRACT

An encapsulated capacitor assembly for mounting onto the housing of an electric motor. The assembly (10) includes a capacitor (11) having a casing and conductor terminals (12) extending from the casing. A unitary housing (14) is provided to fully encapsulate the casing of said capacitor (11). Electrical access is provided to the terminals (14) when the capacitor (11) is fully encapsulated within the housing (14). A method for making the encapsulated capacitor assembly also is provided.

8 Claims, 2 Drawing Sheets

15 16 11 10

13 12 14 16

ENCAPSULATED ELECTRICAL COMPONENT AND METHOD OF MAKING SAME

TECHNICAL FIELD

The present invention relates to an encapsulated electrical component and the method of manufacturing the same. More particularly, the present invention pertains to an encapsulated motor capacitor. Specifically, the present invention relates to a motor capacitor suitable for use in a submerged environment.

BACKGROUND ART

Encapsulated electrical components, such as capacitors, resistors and the like, are well known in the art. Such components, or assemblies thereof, often are encapsulated in a plastic cavity using an epoxy potting compound whenever they are likely to be exposed to harsh environments.

Such an environment is found in the bottom of wells. Submerged pumps and their components must be capable of operation while under water for long periods of time in the well. It is necessary, therefore, that the motor capacitors be suitably encapsulated to withstand the submerged environment.

In the past, a casing was provided in which the motor capacitor could be placed. The casing generally was made of rigid plastic or similar structural material suitably configured to be mounted onto the exterior of the pump motor housing. With the capacitor in place, the casing was filled with a suitable epoxy potting compound. Once the epoxy cured, the capacitor was fully encapsulated with only the capacitor leads extending therefrom; which leads were then connected to the respective terminals of the motor.

This manner of encapsulating has proven economically inefficient. A casing generally is suitable for a limited range of capacitor sizes. As such, different size casings must be used when the capacitor sizes changed for different applications. Furthermore, substantial man-hours are required to assemble and encapsulate the components.

It is necessary, therefore, to provide an encapsulated capacitor assembly, and method of manufacturing the same, which are usable with capacitors of many different sizes. In addition the assemblies must be manufactured with a minimum of man-hours.

DISCLOSURE OF THE INVENTION

It is therefore an object of the present invention to provide an encapsulated capacitor, or similar component, which is capable of withstanding adverse environments.

It is another object of the present invention to provide an encapsulated capacitor, as above, which has a housing of sufficient structural integrity to be mountable to the exterior of a motor housing.

It is a further object of the present invention to provide an encapsulated capacitor, as above, which may incorporate capacitors of various sizes.

It is yet another object of the present invention to provide an encapsulated capacitor, as above, wherein the casing is one, integral component, eliminating the need for potting material.

It is also an object of the present invention to provide a method for manufacturing an encapsulated capacitor, as above, requiring minimal man-hours.

These and other objects of the present invention, as well as the advantages thereof over existing and prior art forms, which will be apparent in view of the following specification, are accomplished by means hereinafter described and claimed.

In general, an encapsulated capacitor assembly for mounting onto the housing of an electric motor, includes a capacitor having a casing. Conductor terminals extend from the casing. A unitary housing fully encapsulates the casing of the capacitor. Electrical access is provided to the terminals when the capacitor is fully encapsulated within the housing. A method for making the foregoing encapsulated capacitor includes the steps of placing a capacitor having terminal conductors within a cavity of a mold. The capacitor is positioned within the cavity with removable guides. A structural material, in a pliable state, is introduced into the cavity while removing the guides. The structural material is allowed to cure forming a substantially rigid, unitary housing.

A preferred, exemplary embodiment of an encapsulated component, as well as a method for making the same, according to the concept of the present invention, is shown by way of example in the accompanying drawings without attempting to show all the various forms and modifications in which the invention might be embodied, the invention being measured by the appended claims and not by the details of the specification.

EXEMPLARY EMBODIMENT FOR CARRYING OUT THE INVENTION

Figure 1:
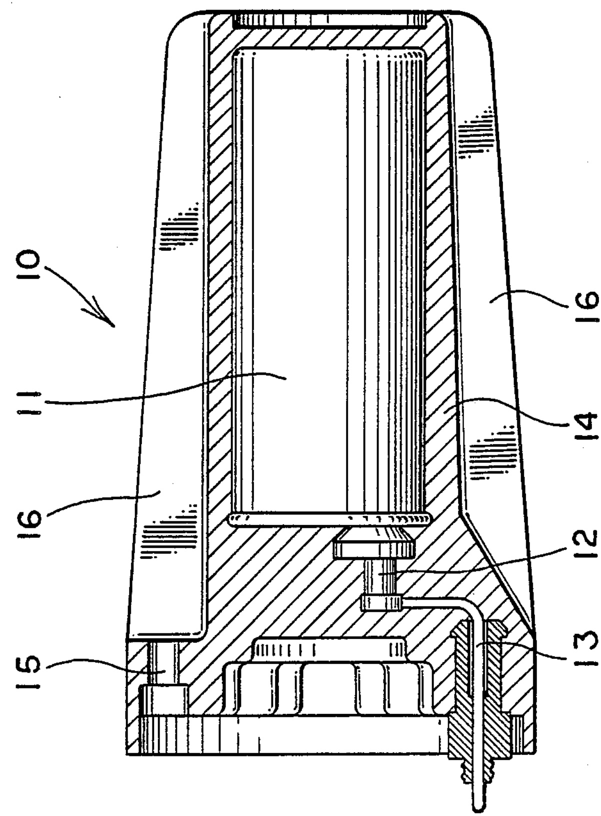
FIG. 1 is a side elevational view, partially in cross-section, of an encapsulated component embodying the concept of the present invention.

An encapsulated capacitor assembly according to the concept of the present invention is indicated generally by the numeral 10 in FIG. 1 of the accompanying drawings. The encapsulated assembly 10 includes a canister capacitor 11 of the type generally used as a starting capacitor for electric motors. As such, capacitor 11 includes terminals 12 extending from one axial end thereof suitable for connection to the electrical leads of a motor, as would be appreciated by one skilled in the art of electric motors. Extension leads 13 may be interconnected with terminals 12 to facilitate connection with the motor leads when capacitor 11 is encapsulated, as will be appreciated hereinbelow.

Capacitor 11 is fully encapsulated in a continuous unitary housing 14. As would be appreciated by one skilled in the art, housing 14 preferably is made of a noncorrosive electrical insulating material suitable for use in the environment in which the motor may be employed. Additionally, the material from which housing 14 is constructed should have good mechanical characteristics to withstand mechanical loading and vibrations. A suitable material has been found to be a polypropylene, or similar structural foam, which possesses the foregoing characteristics and furthermore may be used in injection and foamed-in-place molding processes.

Bolt holes 15 are provided axially at one end of housing 14 to permit attachment to the rear surface of a motor, as would be appreciated by one skilled in the art. It should, of course, be understood that any number of attachment configurations and techniques may be employed without deviating from the disclosure of the invention.

Figure 2:
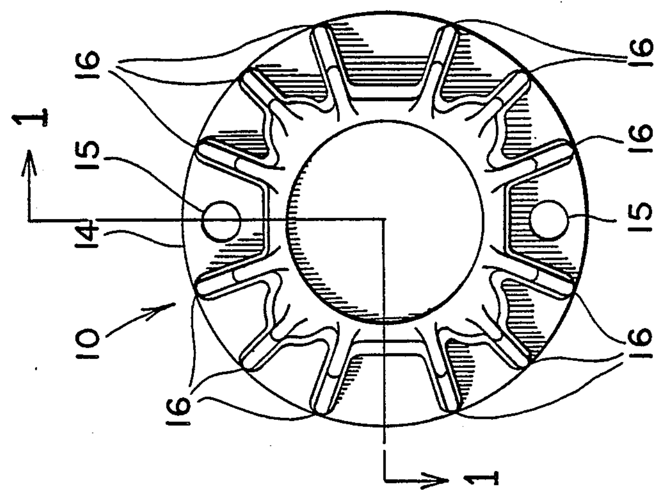
FIG. 2 is an end elevational view of the encapsulated component of FIG. 1.

With reference to FIGS. 1 and 2, a plurality of radial ribs 16 extend axially along the outer surface of housing 14. Ribs 16 serve not only to enhance the structural integrity of housing 14 but also to assist the dissipation of heat. It should be appreciated that polypropylene, particularly as a structural foam, is an effective thermal insulator. Ribs 16 then serve to offset the thermal resistance by providing greater surface area to dissipate heat generated by capacitor 11.

It should be evident that a capacitor assembly 10 according to the foregoing provides a fluid-tight structure as there are no seams or sealants which may otherwise leak. An exemplary method of making such a capacitor assembly 10 can be considered with reference to FIGS. 3A through 3C, inclusive.

Figure 3A:
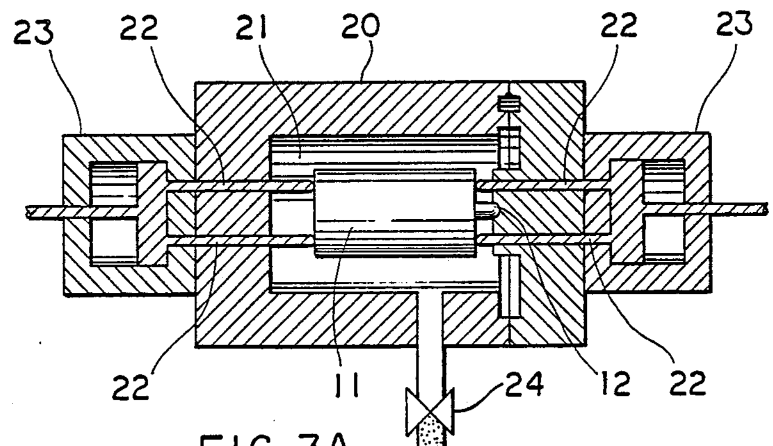
FIGS. 3A through 3C, inclusive, are schematic cross-sections depicting the steps of a method for manufacturing an encapsulated component according to the concept of the present invention.

Specifically, the capacitor assembly 10 may be formed in a typical cavity mold 20 of the type which may be used for foamed-in-place molding. As depicted in FIG. 3A, capacitor 11 is placed within the cavity 21 of mold 20 and held in place by guides, which may be in the form of retractable pins 22. Suitable positioning means, such as reciprocating actuators 23, advance pins 22 sufficiently to hold capacitor 11 in the preselected position.

Figure 3B:
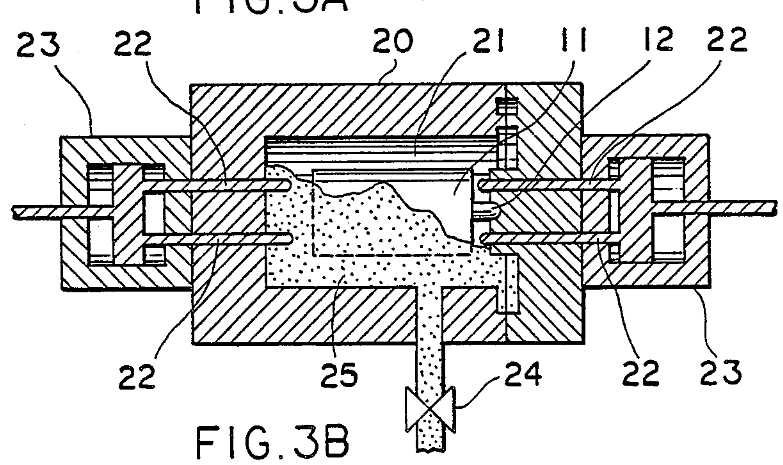

With capacitor 11 suitably in place in cavity 21, the inlet valve 24 of mold 20 may be opened to introduce the polypropylene compound 25, as depicted in FIG. 3B. As would be known to one skilled in the art, compound 25, under controlled conditions, foams and expands to fill cavity 21 and engulf capacitor 11. As compound 25 expands and begins to support capacitor 11 within cavity 21, actuators 23 begin to retract pins 22. The voids left by the retracting pins 22 are then filled by the expanding compound 25.

Figure 3C:
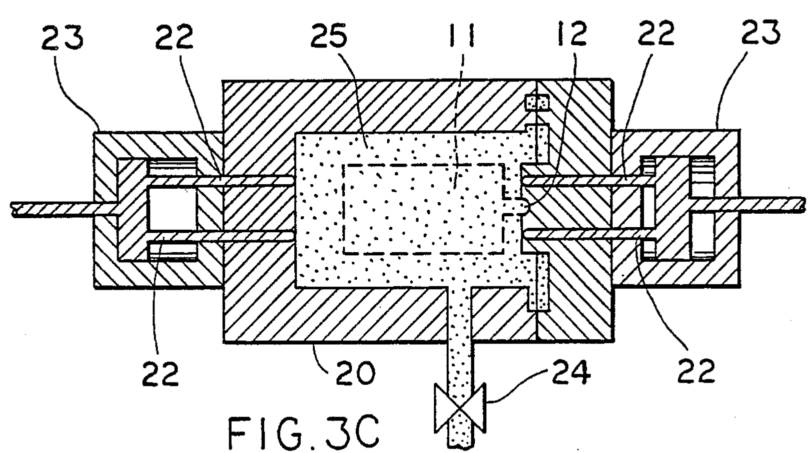

When cavity 21 is filled, and pins 22 are fully retracted, as depicted in FIG. 3C, compound 25 is allowed to cure, forming housing 14. The encapsulated assembly 11 then is extracted from mold 20 and is then in condition to be mounted to a motor, as heretofore discussed.

It should be appreciated that the foregoing method eliminates the need for several assembly and potting steps, as well as the material therefore. Furthermore, the foregoing method and equipment is usable for various size capacitors 11. Indeed, as the space within cavity 21 is filled with compound 25, capacitors 11 of various sizes can be encapsulated in housing 14 merely by employing more or less compound as required. Additionally, terminals 12 or leads 13 may be kept free of compound 25 either by positioning them in recesses in cavity 21 or by covering them with protective caps or by employing similar means, known to the skilled artisan. As such, the finished assembly 10 removed from mold 20 is prepared to be electrically interconnected to corresponding motor leads.

In view of the foregoing, it should be evident that an encapsulated capacitor embodying the concept of the invention disclosed herein provides an environmentally resistant assembly, constructed in an expedient method; and as such carries out the various objects of the invention. Accordingly, the foregoing invention constitutes an advantageous contribution to the art.

I claim:

1. An encapsulated capacitor assembly for mounting onto the housing of an electric motor, comprising:
   - a capacitor having a casing and conductor terminal means extending from one end of said casing;
   - unitary housing means fully encapsulating said casing of said capacitor and defining an outer surface;
   - means for electrically communicating said conductor terminal means with said outer surface on one end of said housing means;
   - heat dissipation means integrally depending from said outer surface; and
   - mounting means for mounting the assembly to the electric motor, said mounting means being proximate to said means for electrically communicating.

2. An assembly according to claim 1, wherein said heat dissipation means includes ribs extending from said housing.

3. An assembly according to claim 2, wherein said ribs extend axially along said housing as structural reinforcements.

4. An assembly according to claim 1, wherein said means for electrically communicating includes electrical leads communicating said terminal means with said outer surface of said housing when said capacitor is encapsulated therein.

5. An assembly according to claim 1, wherein said housing is constructed of an electrically non-conductive material.

6. An assembly according to claim 5, wherein said housing is constructed of a non-corrosive polymer.

7. An assembly according to claim 6, wherein said housing is constructed of a structural foam.

8. An assembly according to claim 7, wherein said housing is constructed of polypropylene.

* * * * *